(12) United States Patent
Petovello et al.

(10) Patent No.: US 12,742,887 B2
(45) Date of Patent: Sep. 22, 2026

(54) LINE OF SIGHT ESTIMATOR

(71) Applicant: Apple Inc., Cupertino, CA (US)

(72) Inventors: Mark G. Petovello, Santa Cruz, CA (US); Qutub Salman Syed, San Jose, CA (US); Mojtaba Bahrami, San Jose, CA (US); Isaac T. Miller, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 520 days.

(21) Appl. No.: 18/102,067

(22) Filed: Jan. 26, 2023

(65) Prior Publication Data

US 2023/0393285 A1 Dec. 7, 2023

Related U.S. Application Data

(60) Provisional application No. 63/349,036, filed on Jun. 3, 2022.

(51) Int. Cl.
*G01S 19/22* (2010.01)
*G01S 19/46* (2010.01)

(52) U.S. Cl.
CPC .............. *G01S 19/22* (2013.01); *G01S 19/46* (2013.01)

(58) Field of Classification Search
CPC ...... G01S 19/22; G01S 19/296; G01S 19/428; G01S 19/46
See application file for complete search history.

(56) References Cited

U.S. PATENT DOCUMENTS 9,766,349 B1 9/2017 Madhow et al.
2006/0267841 A1* 11/2006 Lee ........................ G01S 5/0081 342/357.29
2008/0129598 A1* 6/2008 Godefroy .............. G01S 19/428 342/450

(Continued)

FOREIGN PATENT DOCUMENTS

AU 2015202168 A1 * 11/2015 ........... G01S 19/428
JP 2003057327 A * 2/2003

(Continued)

OTHER PUBLICATIONS

B.W. Parkinson et al., Global Positioning System: Theory and Applications, vol. I; Progress in Astronautics and Aeronatics, vol. 163, American Institute of Aeronautics and Astronautics, Inc., p. 10-11, 1996 (Year: 1996).*

"location." The American Heritage Dictionary of the English Language, Houghton Mifflin, 6th edition, 2016. Credo Reference, https://search.credoreference.com/content/entry/hmdictenglang/location/0 (Year: 2016).*

(Continued)

*Primary Examiner* — Resha Desai
*Assistant Examiner* — Fred H Mull
(74) *Attorney, Agent, or Firm* — BAKERHOSTETLER

(57) ABSTRACT

In accordance with one or more implementations, a method includes receiving, with an electronic device, a first satellite signal and a second satellite signal and determining whether the first satellite signal is LOS. The determining is based on a signal strength of the first satellite signal. The method also includes determining whether the second satellite signal is non-LOS. The determining is based on a signal strength of the second satellite signal. The method further includes estimating a location of the electronic device based on the first satellite signal and the second satellite signal in response to determining that the first satellite signal is LOS and that the second satellite signal is non-LOS.

21 Claims, 8 Drawing Sheets

(56) References Cited

U.S. PATENT DOCUMENTS

| | | | | |
|---|---|---|---|---|
| 2010/0079332 | A1 | 4/2010 | Garin | |
| 2014/0274139 | A1 * | 9/2014 | Bilal | G01S 19/48 455/456.3 |
| 2017/0067999 | A1 | 3/2017 | Chhokra et al. | |
| 2018/0074209 | A1 | 3/2018 | Madhow et al. | |
| 2021/0124057 | A1 * | 4/2021 | Luo | G01S 19/22 |
| 2022/0066048 | A1 * | 3/2022 | Diggelen | G01S 19/396 |
| 2022/0097730 | A1 | 3/2022 | Bacchus et al. | |
| 2022/0283318 | A1 * | 9/2022 | Li | G01S 19/428 |

FOREIGN PATENT DOCUMENTS

| | | |
|---|---|---|
| JP | 2007-248109 | 9/2007 |
| JP | 2009-545934 | 12/2009 |
| JP | 2011-013132 | 1/2011 |
| JP | 2012-503775 | 2/2012 |
| JP | 2013-068451 | 4/2013 |
| JP | 2017-142272 | 8/2017 |
| KR | 10-2012-0124501 A | 11/2012 |
| WO | WO 2015/126499 | 8/2015 |
| WO | WO 2021/006866 | 1/2021 |
| WO | WO 2021/037051 | 3/2021 |
| WO | WO 2022/051195 | 3/2022 |

OTHER PUBLICATIONS

J. Huerta et al., LOS-NLOS Situation Tracking for Positioning Systems, 2006 IEEE 7th Workshop on Signal Processing Advances in Wireless Communications, 5 pages (Year: 2006).*

C. Morelli et al., Hidden Markov Models for Radio Localization in Mixed LOS/NLOS Conditions, IEEE Transactions on Signal Processing, vol. 55(4), p. 1525-1542 (Year: 2007).*

P.-H. Tseng et al., Cooperative Self-Navigation in a Mixed LOS and NLOS Environment, IEEE Transactions on Mobile Computing, vol. 13(2), p. 350-363 (Year: 2014).*

M. Petovello, GNSS Solutions: Relative Positioning, InsideGNSS, May/Jun. 2024, p. 38-39 and 47 (Year: 2014).*

Iwase et al., "Estimation and exclusion of multipath range error for robust positioning," GPS Solutions, Apr. 2012, vol. 17, No. 1, pp. 53-62.

International Search Report and Written Opinion from PCT/US2023/024082, dated Sep. 14, 2023, 13 pages.

Australian Patent Application No. 2023280321; Examination Report dated Aug. 12, 2025, 3 pages.

Japan Patent Application No. 2024-571009 Office Action dated Nov. 18, 2025, 12 pages with English translation.

Korean Patent Application No. 10-2024-7039622, Office Action dated Apr. 24, 2026 in 16 pages with English translation.

* cited by examiner

LINE OF SIGHT ESTIMATOR

CROSS-REFERENCE TO RELATED APPLICATIONS

The present application claims the benefit of U.S. Provisional Patent Application Ser. No. 63/349,036, entitled "LINE OF SIGHT ESTIMATOR," filed Jun. 3, 2022, which is hereby incorporated herein by reference in its entirety and made part of the present U.S. Utility Patent Applications for all purposes.

TECHNICAL FIELD

The present description generally relates to electronic devices including, for example, line of sight estimators for electronic devices.

BACKGROUND

An electronic device such as a laptop, tablet, smartphone, a wearable device, or a navigation system of a vehicle to which a mobile device is attached may include a receiver, which is configured to receive signals from Global Navigation Satellite System (GNSS) satellites, to estimate the location of the electronic device. Typically, multiple satellite signals may be received to determine a location (e.g., three for triangulation and one for time synchronization).

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
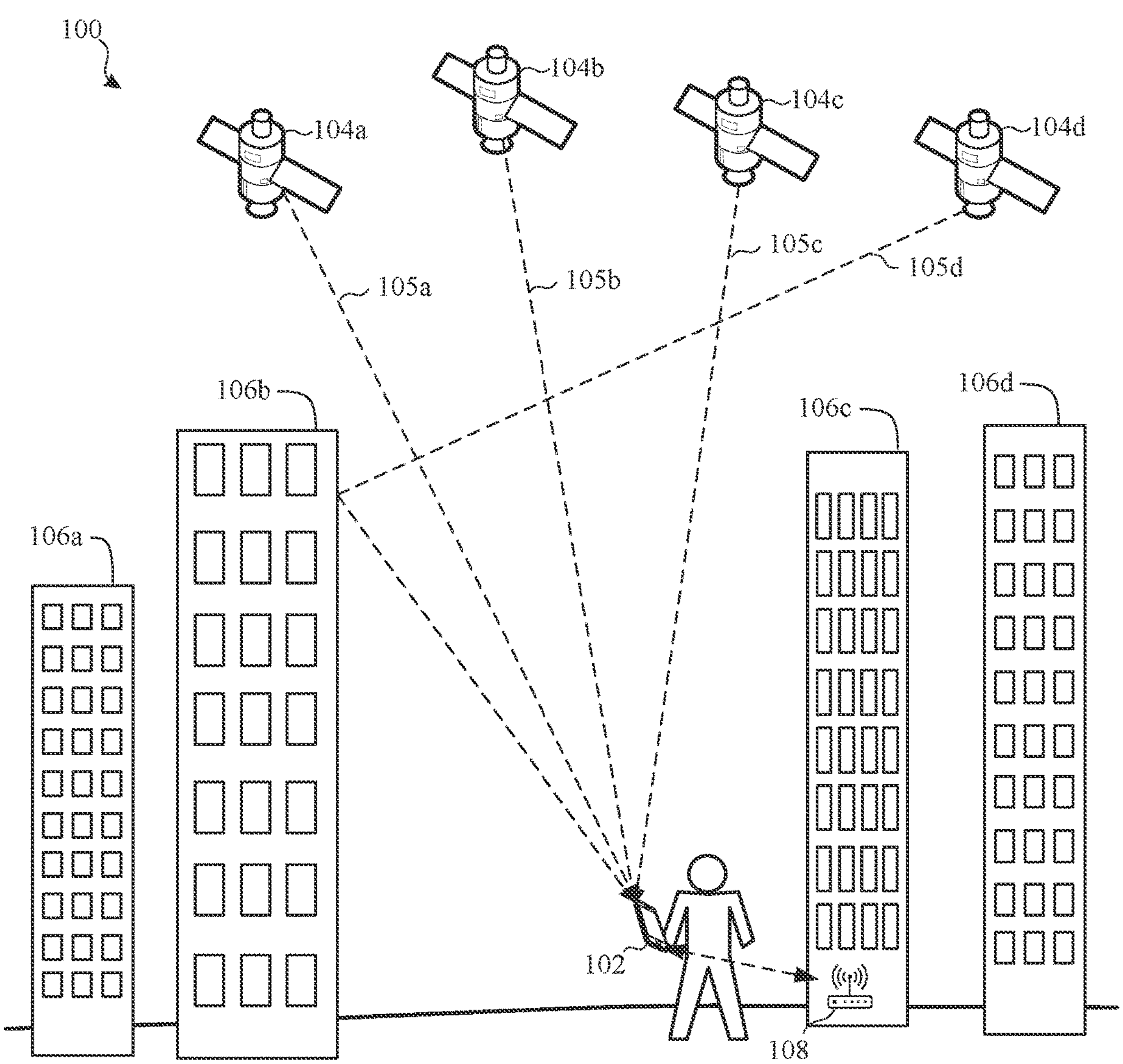
FIG. 1 illustrates an example environment in which an electronic device may use one or more non-line-of-sight (NLOS) satellite signals to estimate a device location in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A location estimation system implemented by an electronic device may include a receiver (e.g., a satellite receiver), which is configured to receive satellite signals (e.g., signals from Global Navigation Satellite System (GNSS) satellites) to estimate the location of the electronic device. Signals received from GNSS satellites may be line of sight (hereinafter, "LOS"), non-line-of-sight (hereinafter, "non-LOS" or "NLOS"), or combinations thereof (e.g., multipath). Typically, a certain number of received LOS signals are needed by the location estimation system to accurately estimate the location of the electronic device.

However, when the received signals do not include a sufficient number of LOS signals (e.g., when one or all received signals are NLOS signals) the position estimation will likely be inaccurate. This may occur in challenging signal environments, such as urban canyons, areas of dense foliage, areas near or within structures such as buildings, and/or other areas that may interfere with LOS reception of signals. Challenging signal environments can result in fewer LOS signals, and/or more NLOS signals, being received by an electronic device. For example, in a challenging signal environment, one or more structures may cause outright blockage of a LOS signal, causing the received signal to be a reflection (e.g., NLOS). An NLOS signal may be the only path from a GNSS transmitter to a receiver but may still be misinterpreted by a receiver that uses a simple LOS model for measurements (e.g., due to environmental attenuation). In the above-mentioned signal environments, fewer LOS signals may be available (e.g., due to the interference caused by the environments), and the NLOS signals that are available tend to yield less accurate measurements on a device.

In the subject system, methods, and non-transitory machine-readable mediums, probabilistic methods are implemented to assist with GNSS positioning, e.g., to compensate for the incomplete and/or distorted GNSS signal information in challenging signal environments. For example, an accuracy improvement can be achieved by re-weighting satellite signals to better utilize both LOS signals and NLOS signals based on probabilities of the various location signals being LOS as determined by hidden Markov models. The probability of a signal being LOS may be based on at least an estimated location of the electronic device (e.g., via Wi-Fi positioning determined from an access point), a signal strength of the location signals, and/or a multipath indicator that is set based on pre-processing received signals. One or more satellite signals may be assigned a weight, for example, such that a signal is weighted less the less likely the signal is LOS. The electronic device may then estimate its position with LOS and NLOS signals with their assigned weights in one or more implementations.

FIG. 1 illustrates an example environment in which an electronic device 102 may use one or more NLOS satellite signals (e.g., satellite signal 105*d*) with GNSS positioning to estimate a device location in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The environment 100 includes an electronic device 102 and GNSS satellites 104*a*, 104*b*, 104*c*, and 104*d* (hereinafter "the satellites 104*a*-104*d*"), which are transmitting satellite signals 105*a*, 105*b*, 105*c*, and 105*d* (hereinafter "the satellite signals 105*a*-105*d*"). The environment also includes buildings 106*a*, 106*b*, 106*c*, and 106*d* (hereinafter "the buildings 106*a*-106*d*"). The buildings 106*a*-106*d* may represent any structure or land formation that obstructs the path of a satellite signal. For explanatory purposes, the environment 100 is illustrated in FIG. 1 as including the one electronic device 102, the four satellites 104*a*-104*d*, the four satellite signals 105*a*-105*d*, the four buildings 106*a*-106*d*, and an access point 108; however, the environment 100 may include any number of electronic devices, satellites, satellite signals, buildings, or access points.

The electronic device 102 may be, for example, a portable computing device such as a laptop computer, a smartphone, a device embedded in, installed in, and/or coupled to a vehicle, a peripheral device (e.g., a digital camera, headphones), a tablet device, a wearable device such as a smartwatch, a band, and the like, or any other appropriate device that includes, for example, one or more wireless interfaces, such as GNSS radios, WLAN radios, cellular radios, Bluetooth radios, Zigbee radios, near field communication (NFC) radios, and/or other wireless radios. In FIG. 1, by way of example, the electronic device 102 is depicted as a smartphone. The electronic device 102 may be, and/or may include all or part of, the electronic device discussed below with respect to FIG. 3, and/or the electronic system discussed below with respect to FIG. 8.

In the example of FIG. 1, the electronic device 102 is held by or otherwise coupled to (e.g., via pocket or strap) a user. However, the electronic device 102 may be coupled to and/or contained within a vehicle. In the example of FIG. 1, the user is traveling by foot (e.g., walking). However, the user may be traveling within a vehicle (e.g., a land vehicle such as an automobile, a motorcycle, a bicycle, or a watercraft or an aircraft vehicle), through water, e.g., swimming, or by other means.

In the environment 100, the electronic device 102 may determine its location based on satellite signals 105*a*-105*d* received from satellites 104*a*-104*d*. For example, the satellites 104*a*-104*d* may be compatible with one or more of the Global Positioning System (GPS), the Globalnaya Navigazionnaya Sputnikovaya Sistema (GLONASS), the Galileo positioning system, and/or generally any positioning system.

For example, the electronic device 102 may determine its respective location (e.g., longitude, latitude, and altitude/elevation) using satellite signals 105*a*-105*d* received from the satellites 104*a*-104*d*. As discussed herein, the electronic device 102 may weight a satellite signal (e.g., using a hidden Markov model, such as a hidden Markov model stored in the local memory of the electronic device 102) for position estimates (e.g., GNSS position estimates determined based on the satellite signals 105*a*-105*d* received from the satellites 104*a*-104*d*), for example, in environments (e.g., environment 100) where one or more received signals may be NLOS, or in environments where no received signals are NLOS.

Other positioning technologies (not shown) may be used independent of or in conjunction with GNSS (e.g., the satellites 104*a*-104*d*) to determine device location. For example, the location of the electronic device 102 may be determined based on time of arrival, angle of arrival, and/or signal strength of signals received from wireless access points (e.g., the access point 108) that may have known locations (e.g., within a building or store, mounted on street posts, etc.). Alternatively or in addition, positioning technologies such as, but not limited to, cellular phone signal positioning (e.g., positioning using cellular network and mobile device signals), Bluetooth signal positioning, and/or image recognition positioning may be used to determine device location.

Moreover, the electronic device 102 may implement an inertial navigation system (INS). The INS uses device sensor(s) (e.g., motion sensors such as accelerometers, gyroscopes) to calculate device state (e.g., device position, velocity, attitude) and/or user state (e.g., user velocity, position) for supplementing location data provided by the above-mentioned positioning technologies in order to estimate device location.

In the environment 100, the buildings 106*a*-106*d* may cause interference between the satellites 104*a*-104*d* and the electronic device 102. In the example of FIG. 1, the buildings 106*a*-106*d* create a dense urban environment that may prevent one or more signals from the satellites 104*a*-104*d* from arriving directly at the electronic device. For example, a direct LOS signal from satellite 104*d* is blocked from being directly received at the electronic device 102 by the building 106*c*, but the satellite signal 105*d* is reflected off of building 106*b* before arriving at the electronic device 102 and is thus an NLOS signal. Conversely, the satellite signals 105*a*-105*c* are illustrated in FIG. 1 as being received at the electronic device 102 directly from the corresponding satellites 104*a*-104*c* and therefore are referred to as LOS signals. In one or more implementations, one or more satellite signals from one or more of the satellites 104*a*, 104*b*, and/or 104*c*, from which LOS satellite signals 105*a*-105*c* are received at the electronic device 102, may also be reflected from one or more buildings of the buildings 106*a*-106*d* and received at the electronic device 102 as multipath signals (e.g., an LOS signal and an NLOS signal from the same satellite). An objective of the subject system is to improve the classification and/or utilization of NLOS signals (e.g., the signal from satellite 104*d*) in dense environments when insufficient LOS signals are available.

Figure 2:
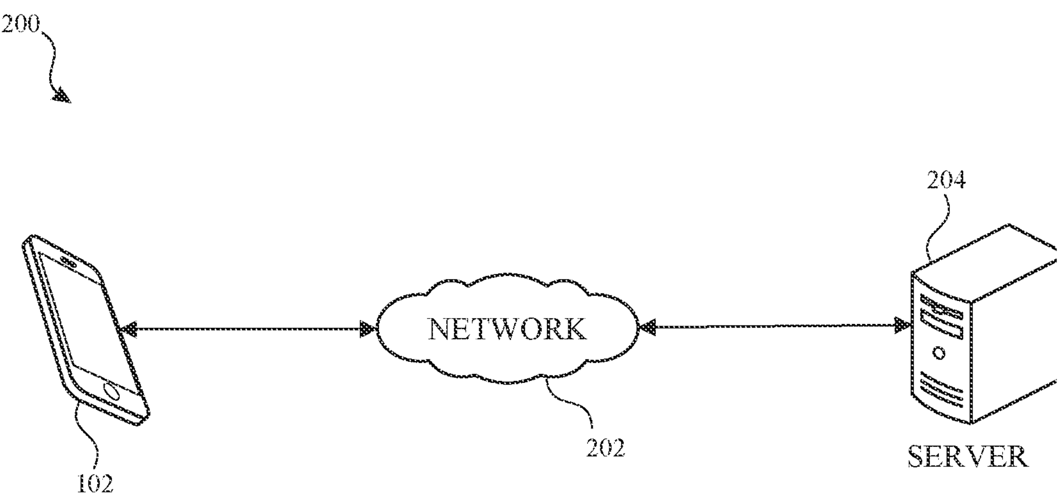
FIG. 2 illustrates an example network environment for providing one or more line of sight (LOS) estimators in accordance with one or more implementations.

FIG. 2 illustrates an example network environment for providing one or more LOS estimators to an electronic device for use with GNSS positioning in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 200 includes the electronic device 102, a network 202 and a server 204. The network 202 may communicatively (directly or indirectly) couple, for example, the electronic device 102 and the server 204. In one or more implementations, the network 202 may be an interconnected network of devices that may include, and/or may be communicatively coupled to, the Internet. For explanatory purposes, the network environment 200 is illustrated in FIG. 2 as including a single electronic device 102 and a single server 204; however, the network environment 200 may include any number of electronic devices and any number (e.g., more or less than one) of servers.

In one or more implementations, the electronic device 102 may be configured to communicate or otherwise interact with the server 204. In one or more implementations, the electronic device 102 may receive one or more statistical and/or machine learning models, such as a hidden Markov model, from the server 204 or provide satellite signal data to estimate a device location. In one or more implementations, the electronic device 102 may be provisioned, e.g., at the time of manufacture or any time thereafter, with firmware and/or operating system code that may include the one or more statistical and/or machine learning models. The electronic device 102 may be, and/or may include all or part of, the device discussed below with respect to FIG. 3, and/or the electronic system discussed below with respect to FIG. 8.

The server 204 may be, and/or may include all or part of the electronic system discussed below with respect to FIG. 8. The server 204 may include one or more servers, such as a cloud of servers, that may be used to generate one or more statistical and/or machine learning models, such as hidden Markov models. For example, the server 204 may generate one or more statistical and/or machine learning models, such as hidden Markov models based on GNSS receiver computations and based on reference data corresponding to ground truth information, as discussed further below with respect to FIG. 4. In one or more implementations, the server 204 may provide the generated one or more statistical and/or machine learning models, such as hidden Markov models to the electronic device 102, e.g., for local storage on the electronic device 102 and/or one or more of the statistical and/or machine learning models may be included in firmware and/or operating system code provisioned on the electronic device 102.

For explanatory purposes, a single server 204 is shown and discussed with respect to various operations, such as generating the one or more statistical and/or machine learning models, such as hidden Markov models and providing the one or more statistical and/or machine learning models, such as hidden Markov models. However, these and other operations discussed herein may be performed by one or more servers, and each different operation may be performed by the same or different servers. In one or more implementations, the one or more statistical and/or machine learning models, such as hidden Markov models may be directly stored on the electronic device 102 before the electronic device 102 is provided to a user, e.g., at or around the time of manufacture of the electronic device 102. In one or more other implementations, one or more models, such as hidden Markov models, may be generated at the electronic device 102 and stored at the electronic device 102 and/or distributed to one or more other electronic devices. In one or more implementations, the server 204 may be responsible for updating one or more statistical and/or machine learning models, such as hidden Markov models, for example, for most (or all) geographic areas possible using data collected since a previous processing.

Figure 3:
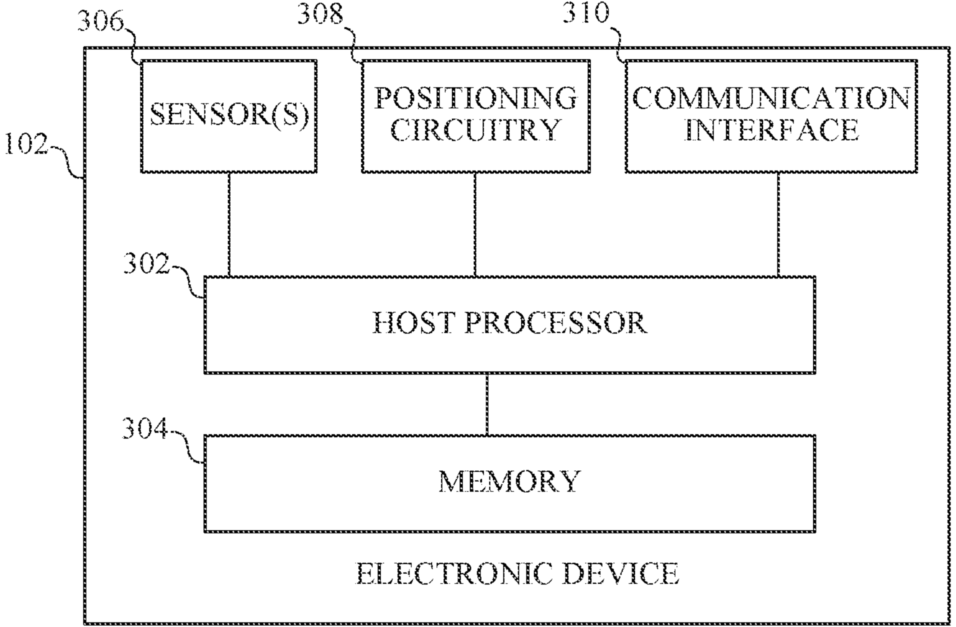
FIG. 3 illustrates an example electronic device that may implement the subject system for estimating a location of the electronic device in accordance with one or more implementations.

FIG. 3 illustrates an example electronic device 102 that may implement the subject system for estimating a location of the electronic device in accordance with one or more implementations. For explanatory purposes, FIG. 3 is primarily described herein with reference to the electronic device 102 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include one or more of a host processor 302, a memory 304, one or more sensor(s) 306, positioning circuitry 308 and/or a communication interface 310. The host processor 302 may include suitable logic, circuitry, and/or code that enable processing data and/or controlling operations of the electronic device 102. In this regard, the host processor 302 may be enabled to provide control signals to various other components of the electronic device 102. The host processor 302 may also control transfers of data between various portions of the electronic device 102. The host processor 302 may further implement an operating system or may otherwise execute code to manage operations of the electronic device 102. In addition, the host processor 302 may implement a location estimator that is discussed further below with respect to FIG. 5.

The memory 304 may include suitable logic, circuitry, and/or code that enable storage of various types of information such as received data, generated data, code, and/or configuration information. The memory 304 may include, for example, random access memory (RAM), read-only memory (ROM), flash, and/or magnetic storage. In one or more implementations, the memory 304 may store hidden Markov models (e.g., as provided by the server 204) for facilitating the estimation of device location. The memory 304 may further store GNSS receiver data, wireless network received data, sensor signal measurements and/or device location estimates, for example, based on a location of the electronic device 102.

The sensor(s) 306 may include one or more motion sensor(s), such as one or more accelerometers, one or more rate gyroscopes, and/or any combination/number (e.g., triad) thereof. The motion sensor(s) may be used to facilitate movement and orientation related functions of the electronic device 102, for example, to detect movement, direction, and orientation of the electronic device 102.

Alternatively or in addition, the sensor(s) 306 may include one or more of a barometer, an electronic magnetometer, or generally any sensor that may be used to facilitate a positioning system. The barometer may be utilized to detect atmospheric pressure, for use in determining altitude change of the electronic device 102. The electronic magnetometer (e.g., an integrated circuit chip) may provide data used to determine the direction of magnetic north, for example, to be used as an electronic compass.

The positioning circuitry 308 may be used in determining the location of the electronic device 102 based on positioning technology. For example, the positioning circuitry 308 may provide for one or more of GNSS positioning (e.g., via a receiver configured to receive satellite signals 105*a*-105*d* from the satellites 104*a*-104*d*), wireless access point positioning (e.g., via a wireless network receiver configured to receive signals from wireless access points), cellular phone signal positioning, Bluetooth signal positioning (e.g., via a Bluetooth receiver), image recognition positioning (e.g., via an image sensor), and/or an INS (e.g., via motion sensors such as any number of accelerometers and/or gyroscopes). The positioning circuitry 308 may also be used in applying weights and/or other adjustments to the received signals. For example, the electronic device 102 may determine that a signal is NLOS and apply a weight to the NLOS signal to reduce its effect on the location deamination of the positioning circuitry 308.

The communication interface 310 may include suitable logic, circuitry, and/or code that enables wired or wireless communication, such as between the electronic device 102 and the server 204. The communication interface 310 may include, for example, one or more of a Bluetooth communication interface, an NFC interface, a Zigbee communication interface, a WLAN communication interface, a USB communication interface, a cellular interface, and/or generally any communication interface.

In one or more implementations, one or more of the host processor 302, the memory 304, the sensor(s) 306, the positioning circuitry 308, the communication interface 310, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 4:
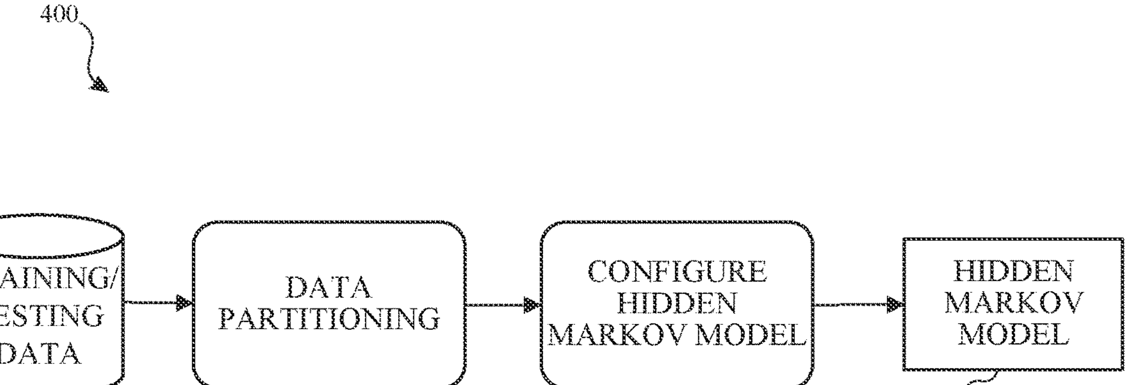
FIG. 4 illustrates an example process for generating one or more probabilistic models in accordance with one or more implementations.

FIG. 4 illustrates an example process 400 for generating one or more probabilistic models (e.g., hidden Markov model 412) in accordance with one or more implementations. For explanatory purposes, the operations of the process 400 are described herein as occurring in serial, or linearly. However, multiple blocks of the process 400 may occur in parallel. In addition, the operations of the process 400 need not be performed in the order shown and/or one or more operations of the process 400 need not be performed and/or can be replaced by other operations.

To begin generating the hidden Markov model 412, training/testing data 408 may be gathered. In one or more implementations, GNSS receiver computations and/or reference device computations, at various locations, may be collected. For example, an operator or operator-less vehicle may traverse a route, where the operator and/or vehicle are equipped with a GNSS receiver (e.g., a mobile device with a GNSS receiver, such as the electronic device 102) and a reference device that includes one or more high-precision location sensors that have a greater precision than that of the GNSS receiver, and/or are not impacted by the aforementioned challenging signal environments.

In one or more implementations, the reference device may determine position estimates independent of the GNSS satellites and/or GNSS system. For example, the reference device may include and/or be communicatively coupled to a directional measurement device (e.g., a compass), a distance measurement device (e.g., a wheel with a known circumference), and/or an INS, and the reference device may determine position estimates based on measurements received from the compass and/or distance measurement device.

At multiple locations, location estimates may be collected (e.g., GNSS measurements such as signal strength) from the GNSS receiver as well as location estimates from the high-precision location sensor of the reference device. For example, the location estimates may correspond to longitude, latitude and/or altitude/elevation estimates of the GNSS receiver, and these estimates may be included as part of the training/testing data 408.

In addition, the training/testing data 408 may include other parameters provided by the GNSS receiver, e.g., parameters used by the GNSS receiver to determine the location estimates. For example, these parameters may indicate or otherwise correspond to a position of the GNSS receiver (e.g., the electronic device 102) relative to the GNSS satellite (e.g., one of the satellites 104*a*-104*d*) providing the LOS sight signals for device location estimation. Examples of these parameters include, but are not limited to: pseudorange (e.g., the distance between the GNSS receiver and the GNSS satellite as measured by the speed of light multiplied by the time the signal has taken to propagate from the satellite to the receiver); pseudorange uncertainty (e.g., confidence value for the pseudorange); range rate (e.g., the rate of change of the distance between the GNSS receiver and the GNSS satellite); range rate uncertainty (e.g., confidence value for the range rate); a multipath indicator (e.g., a value of present, not present, or unknown with respect to whether the signal provided by the GNSS satellite to the GNSS receiver is a multipath signal); elevation above horizon (e.g., of the GNSS satellite); azimuth (e.g., angle from north toward east); whether the measurement was used in the generation of a position fix on the GNSS receiver; and/or position fix location (corresponding to the above-mentioned location estimate as provided by the GNSS receiver, e.g., latitude, longitude, height above ellipsoid). Other parameters that may be included as part of the training/testing data 408 include: a satellite identifier (e.g., constellation, band, carrier frequency and/or satellite number) for the GNSS satellite; measurement latency; a carrier tracking state (e.g., tracking, cycle slip detected, no cycle slips); carrier tracking uncertainty; position fix uncertainty (e.g., horizontal, vertical components); number of satellites used in the position fix; and/or horizontal dilution of precision (HDOP).

In one or more implementations, the location estimates, along with other information gathered by the GNSS receiver and/or reference device, may be used to determine whether a received satellite signal is an LOS signal. For example, the GNSS receiver and/or reference device may determine that a satellite signal is no longer LOS based on an increase in uncertainty (e.g., pseudorange uncertainty, range rate uncertainty, and/or other forms of uncertainty).

Furthermore, at multiple locations, non-satellite signals may be collected as well as their attributes. For example, a non-satellite signal may be a Wi-Fi signal from an access point 108 and its attributes may include an SSID, a signal strength, a frequency, a channel, and/or the like. The information collected about the non-satellite signals may be correlated to one or more pieces of information regarding one or more GNSS satellites. For example, an SSID may be correlated with a latitude and longitude.

Thus, the training/testing data 408 may include one or more of the above-mentioned parameters. As noted above, the training/testing data 408 may be obtained by an operator and/or vehicle equipped with the GNSS receiver and the reference device. Moreover, the training/testing data 408 may be obtained across multiple, similarly-equipped operators/vehicles, such that the database of training/testing data 408 includes a sufficient amount of measurements in order to generate, configure/train, and/or test the hidden Markov model 412.

In addition or alternative to the above-described operator and/or vehicle example, it is possible for the reference data to be provided in conjunction with known road networks corresponding to map data. In this example, the known road networks may correspond to the reference device computations, and the GNSS receiver computations may be provided in a crowd-sourced manner, where locations along the known road networks are compared with location estimates provided by the devices (e.g., the electronic device 102) of end users. This data, and one or more of the other aforementioned parameters, may be collected and stored as the training/testing data 408, in a manner that preserves end user anonymity and privacy.

In one or more implementations, the training/testing data 408 may also include a three-dimensional building model, such as for one or more particular cities or other geographic areas, and/or for urban areas generally. When combined with the reference position and the satellite locations, the building model may be used to determine whether there is an LOS path to each satellite, and/or whether the path to a given satellite is obstructed by one or more buildings. Determining whether there is an LOS path to each satellite allows for the binning of the training/testing data 408 as LOS and NLOS. The data in the LOS and NLOS bins may be analyzed to obtain one or more of the aforementioned statistical and/or machine learning models.

At block 410, the training/testing data 408 may be partitioned to determine a training dataset and a test dataset for the hidden Markov model 412, in one or more implementations. For example, the training dataset as obtained from the training/testing data 408 may be used to initially train/configure the hidden Markov model 412. In one or more implementations, the test dataset as obtained from the training/testing data 408 may be used to tune the hidden Markov model 412 based on the initial training. The training/testing data 408 may be partitioned by labeled categories (e.g., classifications, states, and/or the like). For example, a particular set of information may be labeled (e.g., binned) as derived from an LOS or NLOS satellite signal. In one or more implementations, the training/testing data 408 may be binned into LOS and NLOS, in which case the training/testing data 408 may be partitioned respective to each bin.

At block 411, the hidden Markov model 412 is configured. Configuration may include training and testing the hidden Markov model. Examples of the algorithms used for training and/or testing the hidden Markov model 412 include, but are not limited to, the expectation-maximization algorithm and the forward-backward algorithm. Thus, the hidden Markov model 412 is generated so as to determine a probability that a satellite signal provided to the hidden Markov model 412 is an LOS signal (e.g., hidden states), such as based on training/testing data 408 (e.g., observed variables).

In one or more implementations, the hidden Markov model 412 may be updated periodically with new measurement error data, so as to generate a new, updated hidden Markov model 412. For example, this type of update method may provide for improved maintainability and reduced computational overhead.

Figure 5:
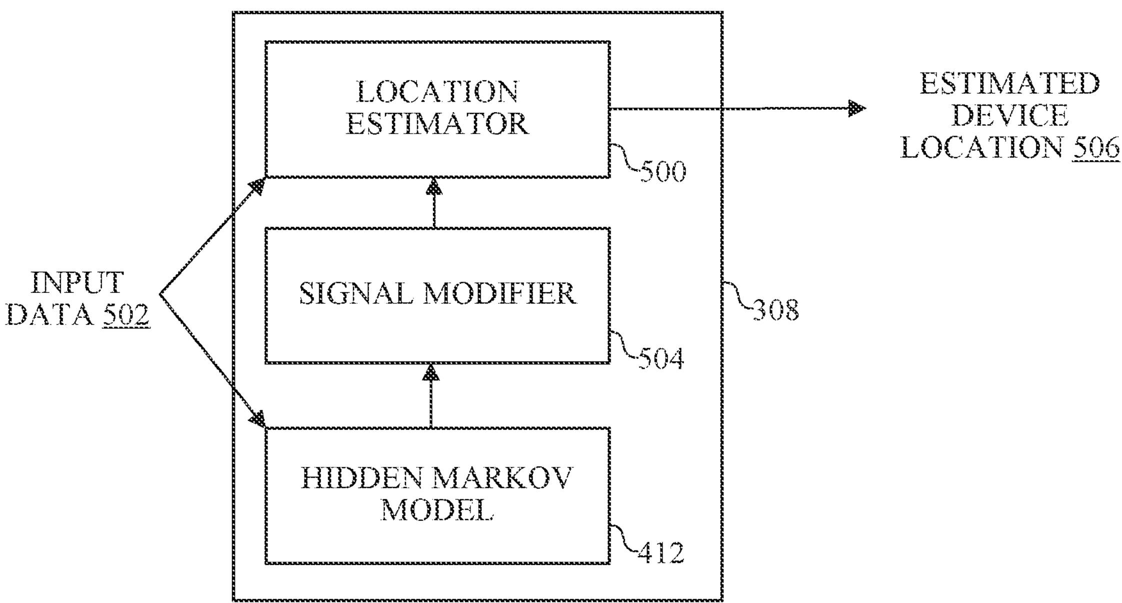
FIG. 5 illustrates an example of a location estimator of the subject system that may be implemented by an electronic device in accordance with one or more implementations.

FIG. 5 illustrates an example of a location estimator 500 of the subject system that may be implemented by an electronic device 102 in accordance with one or more implementations. For example, the location estimator 500 can be implemented by one or more software modules running on the host processor 302 of the electronic device 102. In another example, the location estimator 500 can be implemented by custom hardware (e.g., one or more coprocessors) configured to execute the functionality of the location estimator 500. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In one or more implementations, the positioning circuitry 308 of the electronic device 102 may include a location estimator 500, a signal modifier 504, and the hidden Markov model 412. For example, the hidden Markov model 412 may have been stored on the server 204. In turn, the server 204 may provide a copy of the hidden Markov model 412 to the electronic device 102 via the network 202, and the electronic device 102 may locally store the hidden Markov model 412 (e.g., in the memory 304 of the electronic device 102). In one or more implementations, the hidden Markov model 412 may be stored on the electronic device 102 at or around the time of manufacture, e.g., before the electronic device 102 is provided to a user. In one or more implementations, the hidden Markov model 412 may be generated (e.g., trained and stored) at the electronic device 102. Although hidden Markov models are described herein in connection with various examples, it is appreciated that other statistical and/or machine learning models may be used (e.g., trained and deployed to generate LOS probabilities based on input data 502).

In one or more implementations, the hidden Markov model 412 may be specific to a particular city, a particular satellite, and/or a set of particular satellites. For example, the electronic device 102 may download the hidden Markov model 412 specific to the city (e.g., where respective machine learning models are trained and tested for different cities such as New York, San Francisco, and Los Angeles). Alternatively or in addition, the hidden Markov model 412 may be specific to a type of environment, such that respective hidden Markov models are trained and tested for different environments (e.g., dense urban, urban, suburban). The electronic device 102 may be configured to download (e.g., automatically or by prompting the user) the appropriate hidden Markov model 412 based on the general location of the electronic device 102, and to locally store the hidden Markov model 412.

In order, for example, to prevent NLOS signals from corrupting location estimates based on LOS signals, while still allowing the NLOS signals to be used to aid in the location estimates, the output of the hidden Markov model 412 (e.g., a probability that a satellite signal is LOS) may be used to modify portions of the input data 502 with the signal modifier 504.

As noted above, the hidden Markov model 412 may have been trained and tested based on similar parameters as is inputs to the location estimator 500. The hidden Markov model 412 may be configured to output a probability that a satellite signal (e.g., from the input data 502) is LOS with respect to one or more GNSS satellites. This probability (e.g., as output by the hidden Markov model 412) may be an indication of how usable an NLOS satellite signal may be in determining a location with other satellite signals included with the input data 502.

A satellite signal that is more likely (e.g., above a probability threshold) to be LOS may be treated as an LOS signal, and thus be unmodified by the signal modifier 504 before being used by the location estimator 500 for determining the estimated device location 506. In one or more implementations, a satellite signal that is more likely to be LOS may be re-weighted (e.g., proportional to, or otherwise based on the LOS probability for that satellite signal) by the signal modifier 504 to be more significant when used by the location estimator 500 for determining the estimated device location 506.

A satellite signal that is less likely to be LOS may be re-weighted (e.g., proportional to, or otherwise based on the LOS probability for that satellite signal) by the signal modifier 504 (e.g., according to the process 700 described below) to be less significant when used by the location estimator 500 for determining the estimated device location 506. Additionally or alternatively, a satellite signal that is less likely to be LOS (e.g., below a probability threshold) may be discarded and/or replaced by another available satellite signal included with the input data 502 for use by the location estimator 500 for determining the estimated device location 506. In this way, the signal modifier 504 may modify satellite signals in the input data 502 by weighting the satellite signals according to the respective probabilities that the satellite signals are LOS signals.

Alternatively or in addition, the output of the hidden Markov model 412 may indicate an order to use measurements of one GNSS satellite relative to another GNSS satellite(s) in the signal modifier 504. For example, if the hidden Markov model 412 indicates a high probability of LOS for a particular satellite signal, the measurements corresponding to that GNSS satellite may be given a higher priority (e.g., with respect to the signal modifier 504) relative to measurements of satellite signal(s) with lower probability.

In one or more implementations, the output from the hidden Markov model 412 may indicate whether to flag (e.g., for deny-listing) a particular GNSS satellite(s). In such instances, the signal modifier 504 may be configured to disregard measurements (e.g., location estimates) from those GNSS satellite(s). For example, if the measurements corresponding to a particular GNSS satellite are regularly determined to have a low probability of LOS signals in a particular location, the particular GNSS satellite may be flagged for that particular location.

The location estimator 500 may receive input data 502 (e.g., gathered by the positioning circuitry 308) and/or output from the signal modifier 504 (e.g., weighted satellite signals) as input and may provide an estimated device location 506 as output. The input data 502 may include data similar to those described above with respect to the training/testing data 408. For example, the input data 502 may be used to estimate the position of the electronic device 102 relative to a GNSS satellite (e.g., one of the satellites 104*a*-104*d*) associated with the input data 502. The input data 502 may include, but is not limited to: a location derived from a non-satellite signal, a satellite signal strength, a pseudorange of a satellite corresponding to the satellite signal, and/or a multipath indicator. In one or more implementations, the satellite signal strength and/or the multipath indicator may be received in and/or derived from a satellite signal.

In one or more implementations, the location estimator 500 may be configured to combine radionavigation signals (e.g., the input data 502) with additional sensor data (e.g., as detected by motion sensors on the electronic device 102). For example, the sensor data may include accelerometer measurements corresponding to acceleration of the electronic device 102, and/or gyroscope measurements corresponding to rotation rates of the electronic device 102. The sensor data may be used to improve the position solution by subtracting out antenna motion (e.g., a GNSS antenna) between epochs of sampled radionavigation measurements (e.g., GNSS measurements), effectively allowing multiple epochs of measurements to be statistically combined to reduce error. These techniques may be performed by an INS implemented by and/or communicatively coupled to the location estimator 500.

Moreover, the signal modifier 504 may correspond to an algorithm that uses a series of measurements/signals (e.g., which may contain noise and other inaccuracies) observed over time, and that produces estimates of unknown variables (e.g., device and/or user state) which tend to be more accurate than those based on a single measurement alone (e.g., single GNSS measurements). Thus, measurements of GNSS receiver signals (e.g., the input data 502) may be used in the signal modifier 504 with numerical integration of sensor measurements (e.g., as performed by the INS) to subtract out undesirable antenna motion between epochs.

In one or more implementations, one or more of the location estimator 500, the signal modifier 504, and the hidden Markov model 412, are implemented as software instructions, stored in the memory 304, which, when executed by the host processor 302, cause the host processor 302 to perform particular function(s).

In one or more implementations, one or more of the location estimator 500, the signal modifier 504 and the hidden Markov model 412 may be implemented in software (e.g., subroutines and code), hardware (e.g., an ASIC, a FPGA, a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 6:
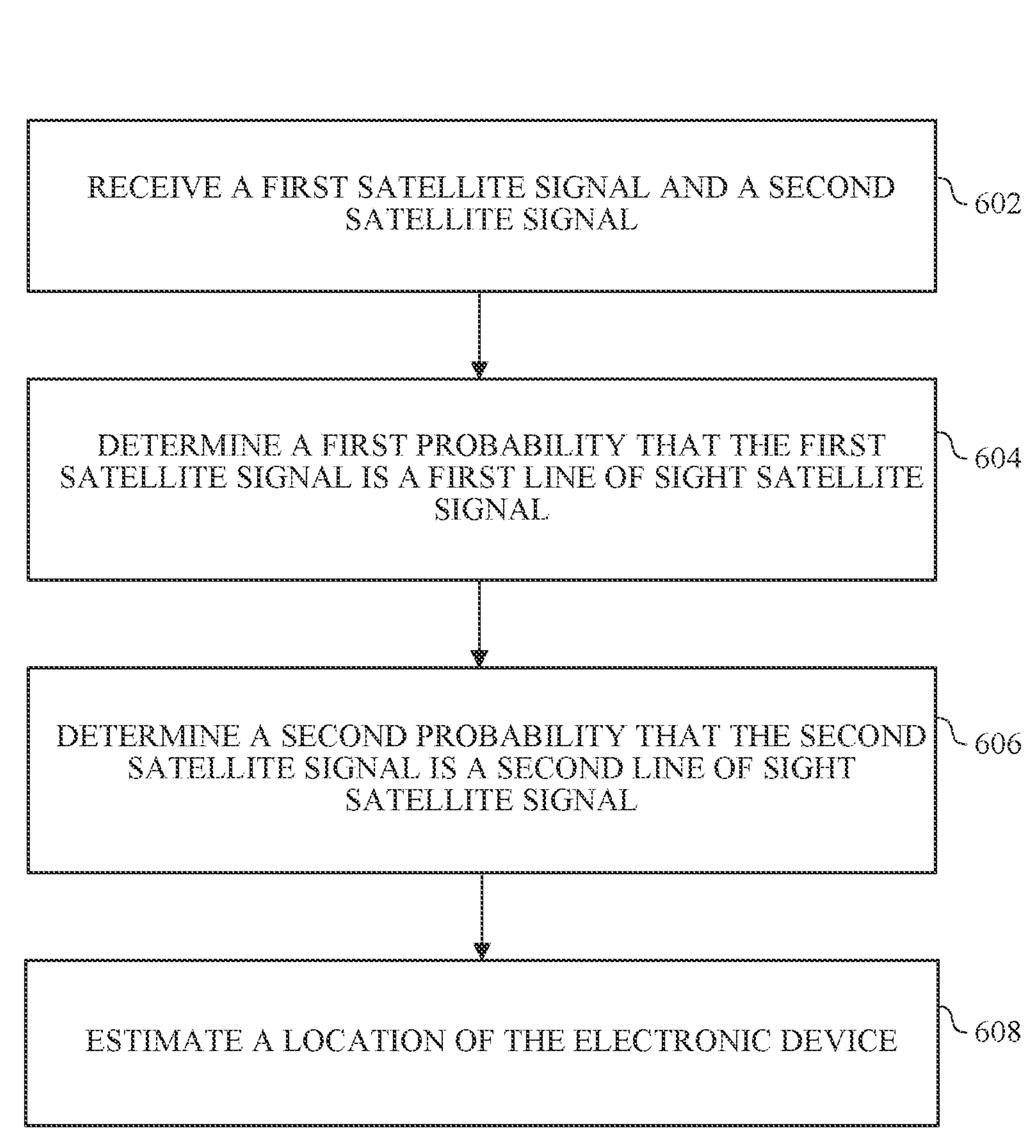
FIG. 6 illustrates a flow diagram of an example process for estimating a location of an electronic device in accordance with one or more implementations.

FIG. 6 illustrates a flow diagram of an example process 600 for estimating a location of an electronic device in accordance with one or more implementations. For explanatory purposes, the process 600 is primarily described herein with reference to FIG. 1. However, the process 600 is not limited to the server 204, and one or more blocks (or operations) of the process 600 may be performed by one or more other components of the server 204, and/or by other suitable devices. Further, for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

At block 602, a first satellite signal and a second satellite signal are received by an electronic device such as the electronic device 102. Although discussion with regard to process 700 is in terms of two satellite signals, it should be understood that the electronic device 102 may receive more than two satellite signals. For example, the electronic device 102 may receive signals from satellites 104*a*-104*d*, any two or more of which may be referred to as a first satellite signal and a second satellite signal.

From the first satellite signal (e.g., a satellite signal 105*a*-105*d* from satellites 104*a*-104*d*) and/or the second satellite signal, the electronic device 102 may receive and/or derive a set of parameters for estimating the position of the electronic device 102. The parameters may include parameters associated with a position of the receiving device relative to the satellite, such as at least one of an azimuth, an elevation, a pseudorange, an uncertainty associated with the pseudorange, a range rate, an uncertainty associated with the range rate, and/or a multipath flag.

Although block 602 may be performed whenever the electronic device 102 is determining its location, the process 600 in particular may be activated based on a probability of an increase in NLOS and/or multipath satellite signals. For example, the process 600 may be triggered when the electronic device 102 is within a threshold distance to a dense area (e.g., a metropolitan area). For example, this triggering of specific scenarios and/or geographic areas in which the process 600 is to be utilized may reduce the probability of increasing processing time, battery utilization, and/or the like in environments where the number of LOS satellite signals is likely to be sufficient. Accordingly, the process 600 may be deactivated based on a probability of increase in LOS satellite signals. For example, the process 600 may be deactivated when the electronic device is beyond a threshold distance from a dense area (e.g., a forest).

At block 604, it is determined (e.g., by the electronic device 102) whether the first satellite signal is LOS. In one or more implementations, a hidden Markov model is used to make the determination. For example, the hidden Markov model may be configured according to the process discussed with regard to FIG. 4 above and may be configured for a particular satellite (e.g., the first satellite). In one or more implementations, the hidden Markov model receives as input at least a signal strength of the first satellite signal (e.g., received at block 602).

Non-satellite signals may include, for instance, wireless access point signals, cellular phone signals, Bluetooth signals, and/or any other non-GNSS signals. The non-satellite signal may provide and/or be used to derive an initial estimated location. The initial estimated location may be based on a location corresponding to a transmitter of the non-satellite signal and a signal strength of the non-satellite signal. For example, a wireless access point may have a known location, and a signal strength from the wireless access point may indicate a distance from the wireless access point. The initial estimated location may also be based on a speed, heading, direction, and/or time of the electronic device 102. For example, the route the electronic device 102 traveled from the location of a wireless access point may be used to determine the initial estimated location via dead reckoning. The initial estimated location may further be based on geography data and/or vertical positioning data of the electronic device 102 for three-dimensional positioning. For example, the electronic device 102 may access its vertical positioning data tracked by its INS, barometer, or the like.

The signal strength input to the hidden Markov model may be the signal strength of the corresponding satellite signal. Signal strength may be expressed in any form, such as carrier-to-noise density, signal-to-noise ratio, and/or the like. For example, the electronic device 102 may receive a satellite signal, pre-process the satellite signal (e.g., signal smoothing via a Hatch filter), and determine a signal-to-noise ratio (e.g., for use with a hidden Markov model corresponding to the satellite).

In one or more implementations, the hidden Markov model may also receive, as input, a multipath indicator. A multipath indicator may be an indicator, determined by the GNSS receiver of the electronic device 102 (e.g., positioning circuitry 308) based on at least the satellite signal, indicating that the satellite signal is likely a multipath signal. The multipath indicator may be a value of present, not present, or unknown with respect to whether the signal has multipath attributes (e.g., is likely multipath).

A statistical and/or machine learning model such as a hidden Markov model may receive one or more observed variables to determine a sequence or set of hidden states, where the observed variables are dependent on the states. In the case of the present disclosure, the hidden states may be LOS or NLOS, and the observed variables include a location derived from a non-satellite signal (which may be used to derive the difference between the measured pseudorange and the predicted pseudorange to the satellite derived independently of GNSS), a signal strength of the satellite signal, a pseudorange of a satellite corresponding to the satellite signal, and/or a multipath indicator. Accordingly, a hidden Markov model may be used to determine a probability that the corresponding satellite signal is LOS based on the received inputs. That is, in one or more implementations, the hidden Markov model may be used to determine the most likely state of the satellite signal given a particular set of observed variables. In one or more implementations, the output of the hidden Markov model may be a probability that the first satellite signal is an LOS signal or a probability that the first satellite signal is an NLOS signal. In one or more implementations, the electronic device 102 may have probability thresholds by which satellite signals (e.g., the first satellite signal) may be classified as being LOS or NLOS. For example, if the first hidden Markov model estimates the probability of the first satellite signal being LOS as 80% and the electronic device 102 has an LOS threshold value of 75%, the electronic device 102 may treat the first satellite signal as an LOS signal. It should be understood that implementations of the subject technology are not limited to the use of hidden Markov models but may also or instead utilize other models such as stochastic models, probabilistic models, statistical models, machine learning models, finite state machines, heuristic processes, and/or the like. It should also be understood that if a satellite broadcast multiple signals (e.g., L1 and L5), the observed variables from one or more of the signals may be used to update the model corresponding to the satellite.

At block 606, it is determined (e.g., by the electronic device 102) whether the second satellite signal is LOS. For example, an LOS probability may be determined by a second hidden Markov model corresponding to the satellite from which the second satellite signal came (e.g., a second satellite). The second hidden Markov model may be configured (e.g., trained) according to the process discussed with regard to FIG. 4 above. The second hidden Markov model may receive, as input, at least a signal strength of the second satellite signal. The inputs to the second hidden Markov model may be similar to the inputs to the first hidden Markov model in block 604, and thus their descriptions will not be repeated. However, the non-satellite signal may be the same non-satellite signal used as input to the first hidden Markov model. Like the first hidden Markov model, the second hidden Markov model may determine the most likely state of the satellite signal given a particular set of observed variables. In one or more implementations, the output of the second hidden Markov model may be a probability that the second satellite signal is an LOS signal and/or a probability that the second satellite signal is an LOS signal. In one or more implementations, the electronic device 102 may have probability thresholds by which satellite signals (e.g., the second satellite signal) may be classified as being LOS or NLOS. It should be understood that, although two signals are described, any and/or each signal used in determining the location of the electronic device 102 may be classified as LOS or NLOS.

At block 608, a location of the electronic device 102 may be estimated (e.g., by the positioning circuitry 308 of the electronic device 102) based at least in part on the first satellite signal and the second satellite signal in response to determining whether the first satellite signal is LOS and whether the second satellite signal is non-LOS. The electronic device 102 may use any available method of estimating a location based on the determination of whether the first satellite signal is LOS and the second satellite signal is non-LOS. In one or more implementations, the satellite signals may be any combination of raw or weighted first and second satellite signals, the combination determined based on the determination of whether the first satellite signal is an LOS signal and whether the second satellite signal is an LOS signal. For example, as described with regard to FIG. 7 below, the location may be estimated based on the first satellite signal and the second satellite signal, in which at least the second satellite signal is weighted based on its NLOS properties (e.g., based on a probability that the second satellite signal is an LOS signal). In one or more such implementations, determining that the satellite signals to be used in estimation of a device location include at least one NLOS signal (e.g., the second satellite signal) may be a trigger for determining weights to apply to one or more satellite signals (e.g., the NLOS signals and/or the LOS signals) for improving the accuracy of location estimation.

Figure 7:
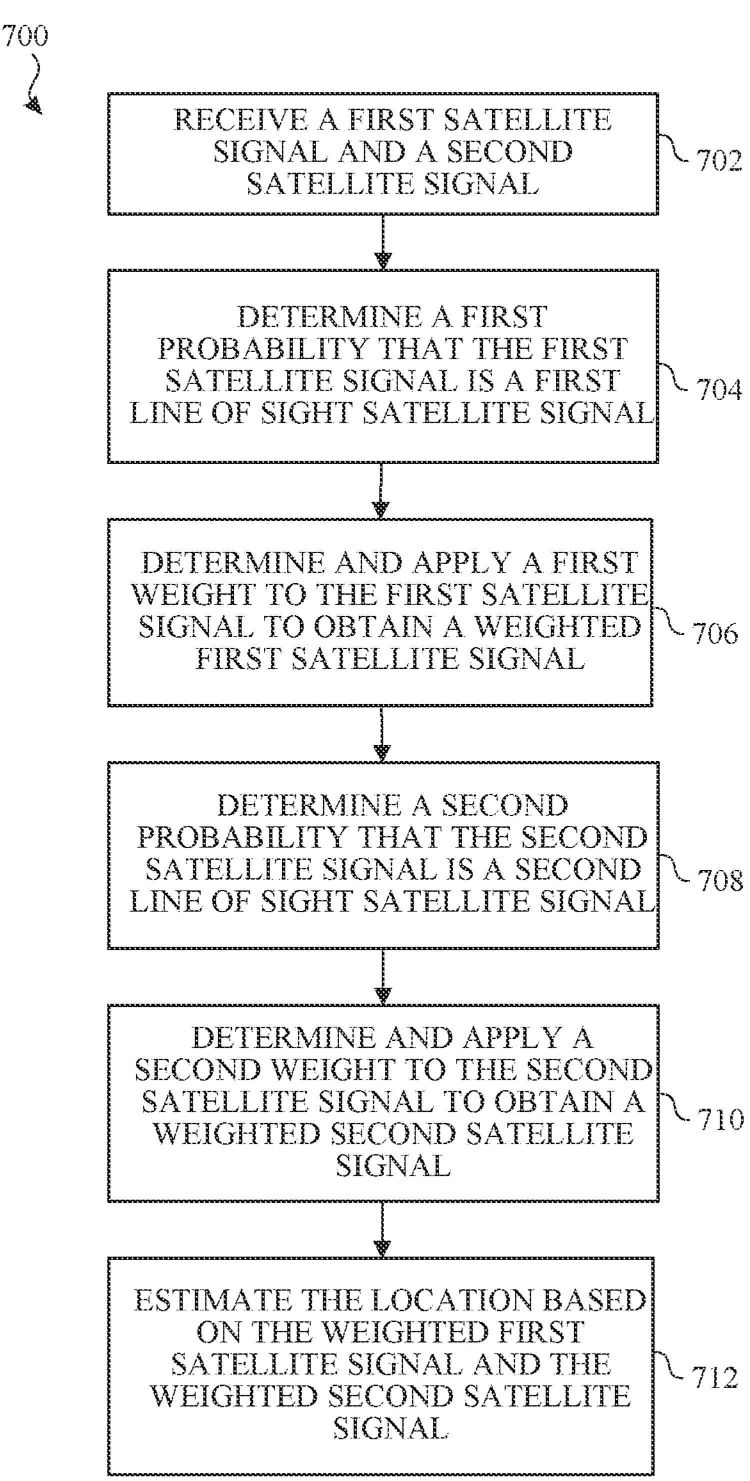
FIG. 7 illustrates a flow diagram of another example process for estimating a location of an electronic device in accordance with one or more implementations.

FIG. 7 illustrates a flow diagram of an example process for estimating a location of an electronic device in accordance with one or more implementations. For explanatory purposes, the process 700 is primarily described herein with reference to FIG. 1. However, the process 700 is not limited to the electronic device 102, and one or more blocks (or operations) of the process 700 may be performed by one or more other components of the electronic device 102, and/or by other suitable devices. Further, for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

At block 702, a first satellite signal and a second satellite signal are received by an electronic device, such as the electronic device 102 (e.g., as input data 502). Although discussion with regard to process 700 is in terms of two satellite signals is provided herein, it should be understood that the electronic device 102 may receive more than two satellite signals. For example, the electronic device 102 may receive satellite signals **105*a*-105*d* from satellites 104*a*-104*d***, any two or more of which may be referred to as a first satellite signal and a second satellite signal.

From the first satellite signal (e.g., a signal from satellite signals **105*a*-105*d*) and/or the second satellite signal, the electronic device 102 may receive and/or derive a set of parameters for estimating the position of the electronic device 102**. The parameters may include parameters associated with a position of the receiving device relative to the satellite, such as at least one of an azimuth, an elevation, a pseudorange, an uncertainty associated with the pseudorange, a range rate, an uncertainty associated with the range rate, and/or a multipath flag.

At block 704, a probability that the first satellite signal is LOS is determined. In one or more implementations, an LOS probability is determined using a hidden Markov model corresponding to the satellite from which the first satellite signal came (e.g., the hidden Markov model 412). In one or more implementations, the hidden Markov model is configured according to the process discussed with regard to FIG. 4 above. One or more of the inputs to the hidden Markov model corresponding to the first satellite may be based on and/or include, for example, a location derived from a non-satellite signal, a signal strength of the satellite signal, a pseudorange of a satellite corresponding to the satellite signal, and/or a multipath indicator.

Non-satellite signals may include, for instance, wireless access point signals, cellular phone signals, Bluetooth signals, and/or any other non-GNSS signals. The non-satellite signal may provide an initial estimated location. The initial estimated location may be based on a location corresponding to a transmitter of the non-satellite signal and a signal strength of the non-satellite signal. For example, a wireless access point may have a known location and a signal strength from the wireless access point may indicate a distance from the wireless access point. The initial estimated location may also be based on a speed, heading, direction, and/or time of the electronic device 102. For example, the route the electronic device 102 traveled from the location of a wireless access point may be used to determine the initial estimated location via dead reckoning. The initial estimated location may further be based on geography data and/or vertical positioning data of the electronic device 102 for three-dimensional positioning. For example, the electronic device 102 may access its vertical positioning data tracked by its INS.

The signal strength input to a hidden Markov model may be the signal strength of the satellite signal (e.g., the satellite signal corresponding to the hidden Markov model). Signal strength may be expressed in any form such as carrier-to-noise density, signal-to-noise ratio, and/or the like. For example, the electronic device 102 may receive a satellite signal, pre-process the satellite signal (e.g., signal smoothing via a Hatch filter), and determine a signal-to-noise ratio (e.g., for use with a hidden Markov model corresponding to the satellite).

A multipath indicator may be an indicator determined by the GNSS receiver of the electronic device 102 (e.g., positioning circuitry 308) indicating that the signal is likely a multipath signal. The multipath indicator may be a value of present, not present, or unknown with respect to whether the signal has multipath attributes (e.g., is likely multipath).

A hidden Markov model may receive one or more observed variables to determine a sequence or set of hidden states, where the observed variables are dependent on the states. In one or more implementations of the present disclosure, the hidden states are LOS or NLOS, and the observed variables include a non-satellite signal, a signal strength of the satellite signal, a pseudorange of a satellite corresponding to the satellite signal, and/or a multipath indicator. Accordingly, a hidden Markov model may determine a probability that the corresponding satellite signal is LOS based on the received inputs. In one or more implementations, the hidden Markov model may determine the most likely state of the satellite signal given a particular set of observed variables.

At block 706, a weight may be determined and applied (e.g., by the signal modifier 504) to the first satellite signal to obtain a weighted first satellite signal. The weight may be determined according to the probability that the signal is LOS. The weight may be such that the impact of a likely NLOS signal is reduced in location estimation. For example, in one or more implementations, a first weight is less than a second weight such that a respective first satellite signal is weighted less than a second satellite signal in determining an estimated location, when a first probability of the first satellite signal being LOS is less than a second probability of the second satellite signal being LOS. Reducing the weight of an NLOS satellite signal allows reduction of the error that may be introduced by the NLOS satellite signal into the location estimation while still allowing for use of the NLOS satellite signal in areas where the number of available LOS satellite signals is low or insufficient. Additionally or alternatively, likely LOS signals may be weighted such that their impact is increased in location estimation. For example, in one or more implementations, a first weight is more than a second weight such that a respective first satellite signal is weighted more than a second satellite signal in determining an estimated location, when a first probability of the first satellite signal being LOS is higher than a second probability of the second satellite signal being LOS.

In one or more implementations, when numerous satellite signals are available (e.g., greater than four) the first satellite signal may be discarded, and another available satellite signal may be used instead. For example, the first satellite signal may be discarded when the first satellite signal is determined to be an NLOS signal and when an LOS signal or another signal having a relatively higher probability of being LOS is available. For example, utilizing a different NLOS signal with a relatively higher LOS probability may have a less negative impact on location determination while still allowing for location determination in complex environments with insufficient LOS signals. In one or more implementations, a probability of a signal being an LOS signal may be compared against a threshold value for LOS probability, and the signal may be discarded when the probability is below the threshold. The threshold value may be based on a number of available LOS signals. For example, when fewer LOS signals are available, the threshold value may be reduced so that the system has a higher tolerance for signals that are less likely to be LOS. In one or more implementations, the signal may be weighted such that the signal is effectively discarded when determining the location of the electronic device 102.

In one or more implementations, the probability and weight may be periodically updated. The probability and weight may be updated by periodically updating the inputs to the hidden Markov model. For example, as the electronic device moves, the location derived from the non-satellite signal may change (e.g., via dead reckoning), which may cause the hidden Markov model to change the probability that a signal is LOS that may then affect the weight that is assigned to the satellite signal. Similarly, the weight may be progressively reduced as the probability of the satellite signal being LOS increases, and vice versa, so as to prevent sudden changes in the estimated location of the electronic device 102.

At block 708, a probability that the second satellite signal is LOS is determined. In one or more implementations, an LOS probability is determined by a second hidden Markov model corresponding to the satellite from which the second satellite signal came (e.g., the hidden Markov model 412). In one or more implementations, the second hidden Markov model is configured according to the process discussed with regard to FIG. 4 above. The inputs to the second hidden Markov model corresponding to the second satellite may be based on and/or may include a location derived from a non-satellite signal, a signal strength of the second satellite signal, a pseudorange of the second satellite, and/or a multipath indicator of the second satellite signal. The inputs to the second hidden Markov model may be similar to the inputs to the first hidden Markov model in block 704, and thus their descriptions will not be repeated. However, the non-satellite signal may be the same non-satellite signal used as input to the first hidden Markov model. It should be understood that, although two signals are described, a probability may be determined for any and/or each satellite signal used in determining the location of the electronic device 102.

At block 710, a weight may be determined and applied to the second satellite signal to obtain a weighted second satellite signal. The weight may be determined (e.g., by the signal modifier 504) according to the probability that the second signal is LOS. The weight may be such that the impact of a likely NLOS signal is reduced in location estimation. Reducing the weight of an NLOS satellite signal reduces the error that may be introduced by the NLOS signal into the location estimation while still allowing for use of the NLOS satellite signal in areas where the number of available LOS satellite signals is low or insufficient. Additionally or alternatively, likely LOS signals may be weighted such that their impact is increased in location estimation. It should be understood that, although two signals are described, a weight may be determined for any and/or each signal used in determining the location of the electronic device 102.

At block 712, the location of the electronic device 102 may be estimated based on the weighted first satellite signal and the weighted second satellite signal. A location estimator (e.g., the location estimator 500) may receive satellite signals (e.g., the input data 502) as well as the weighted satellite signals from block 710 as input. The location estimator may utilize the satellite signals and/or the weighted satellite signals to provide an estimated device location (e.g., the estimated device location 506) as output.

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, Twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth, etc.), controlling the amount of specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publicly available information.

Figure 8:
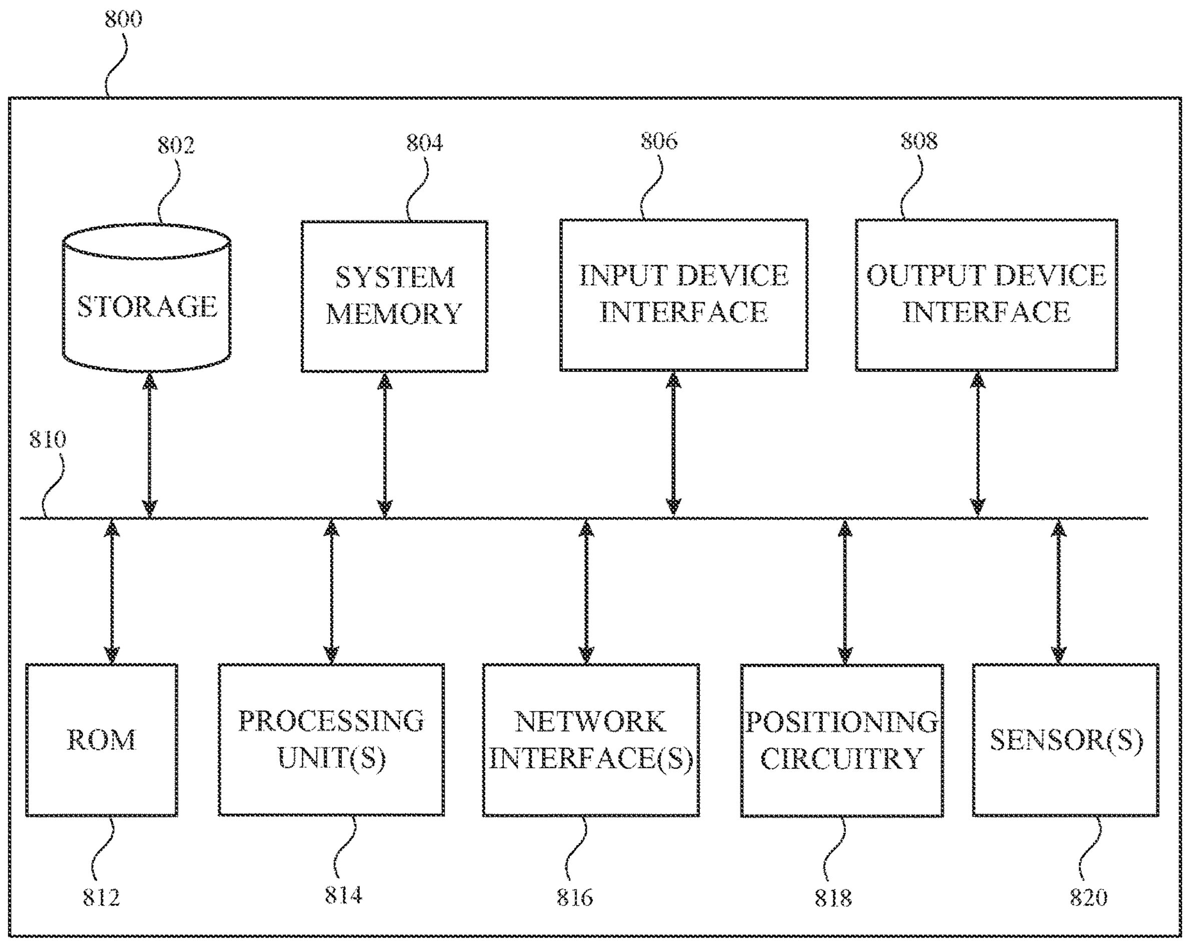
FIG. 8 illustrates an example electronic system with which aspects of the subject technology may be implemented in accordance with one or more implementations.

FIG. 8 illustrates an example electronic system 800 with which aspects of the subject technology may be implemented in accordance with one or more implementations. The electronic system 800 can be, and/or can be a part of, any electronic device for generating the features and processes described in reference to FIGS. 1-3, including but not limited to a laptop computer, tablet computer, smartphone, and wearable device (e.g., smartwatch, fitness band). The electronic system 800 may include various types of machine-readable media and interfaces for various other types of machine-readable media. The electronic system 800 includes one or more processing unit(s) 814, a persistent storage device 802, a system memory 804 (and/or buffer), an input device interface 806, an output device interface 808, a bus 810, a ROM 812, one or more processing unit(s) 814, one or more network interface(s) 816, positioning circuitry 818, sensor(s) 820, and/or subsets and variations thereof.

The bus 810 collectively represents all system, peripheral, and chipset buses that communicatively connect the numerous internal devices of the electronic system 800. In one or more implementations, the bus 810 communicatively connects the one or more processing unit(s) 814 with the ROM 812, the system memory 804, and the persistent storage device 802. From these various memory units, the one or more processing unit(s) 814 retrieves instructions to execute and data to process in order to execute the processes of the subject disclosure. The one or more processing unit(s) 814 can be a single processor or a multi-core processor in different implementations.

The ROM 812 stores static data and instructions that are needed by the one or more processing unit(s) 814 and other modules of the electronic system 800. The persistent storage device 802, on the other hand, may be a read-and-write memory device. The persistent storage device 802 may be a non-volatile memory unit that stores instructions and data even when the electronic system 800 is off. In one or more implementations, a mass-storage device (such as a magnetic or optical disk and its corresponding disk drive) may be used as the persistent storage device 802.

In one or more implementations, a removable storage device (such as a floppy disk, flash drive, and its corresponding disk drive) may be used as the persistent storage device 802. Like the persistent storage device 802, the system memory 804 may be a read-and-write memory device. However, unlike the persistent storage device 802, the system memory 804 may be a volatile read-and-write memory, such as RAM. The system memory 804 may store any of the instructions and data that one or more processing unit(s) 814 may need at runtime. In one or more implementations, the processes of the subject disclosure are stored in the system memory 804, the persistent storage device 802, and/or the ROM 812. From these various memory units, the one or more processing unit(s) 814 retrieves instructions to execute and data to process in order to execute the processes of one or more implementations.

The bus 810 also connects to the input device interface 806 and output device interface 808. The input device interface 806 enables a user to communicate information and select commands to the electronic system 800. Input devices that may be used with the input device interface 806 may include, for example, alphanumeric keyboards and pointing devices (also called "cursor control devices"). The output device interface 808 may enable, for example, the display of images generated by electronic system 800. Output devices that may be used with the output device interface 808 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 810 also connects to positioning circuitry 818 and sensor(s) 820. The positioning circuitry 818 may be used in determining device location based on positioning technology. For example, the positioning circuitry 818 may provide for one or more of GNSS positioning, wireless access point positioning, cellular phone signal positioning, Bluetooth signal positioning, image recognition positioning, and/or an INS (e.g., via motion sensors such as an accelerometer and/or gyroscope).

In one or more implementations, the sensor(s) 820 may be utilized to detect movement, travel, and orientation of the electronic system 800. For example, the sensor(s) may include an accelerometer, a rate gyroscope, and/or other motion-based sensor(s). Alternatively or in addition, the sensor(s) 820 may include one or more audio sensors(s) and/or image-based sensor(s) for determining device position. In another example, the sensor(s) 820 may include a barometer which may be utilized to detect atmospheric pressure (e.g., corresponding to device altitude).

Finally, as shown in FIG. 8, the bus 810 also couples the electronic system 800 to one or more networks and/or to one or more network nodes through the one or more network interface(s) 816. In this manner, the electronic system 800 can be a part of a network of computers (such as a LAN or a wide area network ("WAN")). Any or all components of the electronic system 800 can be used in conjunction with the subject disclosure.

Implementations within the scope of the present disclosure can be partially or entirely realized using a tangible machine-readable storage medium (or multiple tangible machine-readable storage media of one or more types) encoding one or more instructions, such as the persistent storage device 802 and/or the system memory 804. The tangible machine-readable storage medium also can be non-transitory in nature.

The machine-readable storage medium can be any storage medium that can be read, written, or otherwise accessed by a general purpose or special purpose computing device, including any processing electronics and/or processing circuitry capable of executing instructions. For example, without limitation, the machine-readable medium can include any volatile semiconductor memory, such as RAM, DRAM, SRAM, T-RAM, Z-RAM, and TTRAM. The machine-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the machine-readable storage medium can include any non-semiconductor memory, such as optical disk storage, magnetic disk storage, magnetic tape, other magnetic storage devices, or any other medium capable of storing one or more instructions. In one or more implementations, the tangible machine-readable storage medium can be directly coupled to a computing device, while in other implementations, the tangible machine-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation.

Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any implementation described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:

receiving, with an electronic device, a first satellite signal and a second satellite signal;

determining, with the electronic device, a first probability that the first satellite signal is a first line of sight satellite signal based at least in part on a first difference between a first measured range to a first satellite and a first predicted range to the first satellite computed using a first location of the electronic device derived from a non-satellite signal;

determining, with the electronic device, a second probability that the second satellite signal is a second line of sight satellite signal based at least in part on a second difference between a second measured range to a second satellite and a second predicted range to the second satellite computed using the first location of the electronic device derived from the non-satellite signal; and estimating, with the electronic device, a second location of the electronic device based at least in part on the first probability that the first satellite signal corresponds to the first line of sight satellite signal, the second probability that the second satellite signal corresponds to the second line of sight satellite signal, and at least two other satellite signals.

2. The method of claim 1, wherein:

determining the first probability is based at least in part on a first signal strength of the first satellite signal; and determining the second probability is based at least in part on a second signal strength of the second satellite signal.

3. The method of claim 1, wherein determining the first probability and the second probability is based on a first hidden Markov model and a second hidden Markov model, respectively.

4. The method of claim 3, wherein inputs to the first and second hidden Markov models include at least one of the first location of the electronic device derived from the non-satellite signal, a signal strength of a satellite signal corresponding to the first or second hidden Markov models or a third hidden Markov model, a pseudorange of a satellite corresponding to the satellite signal, or a multipath indicator that is set based on pre-processing received signals.

5. The method of claim 4, wherein the estimated second location of the electronic device is based on a third location corresponding to a transmitter of the non-satellite signal and a signal strength of the non-satellite signal.

6. The method of claim 4, wherein the estimated second location is further based on at least one of a speed, heading, direction, and time of the electronic device.

7. The method of claim 4, wherein the estimated second location is a three-dimensional position further based on at least one of geography data and vertical positioning data of the electronic device.

8. The method of claim 1, further comprising, before estimating the second location of the electronic device, discarding the second satellite signal in response to the second probability being less than a threshold value.

9. The method of claim 8, wherein the threshold value is based on a number of available line of sight satellite signals.

10. The method of claim 1, wherein the estimating the second location of the electronic device comprises:

determining a first weight based on the first probability;

applying the first weight to the first satellite signal to generate a weighted first satellite signal;

determining a second weight based on the second probability; and applying the second weight to the second satellite signal to generate a weighted second satellite signal.

11. The method of claim 10, wherein the estimating the second location of the electronic device further comprises estimating the second location based on the weighted first satellite signal and the weighted second satellite signal.

12. The method of claim 11, wherein the first weight is less than the second weight such that the first satellite signal is weighted less than the second satellite signal in the estimated second location, in response to the first probability being less than the second probability.

13. An electronic device comprising:

a memory; and one or more processors configured to perform operations comprising:

receiving a first satellite signal and a second satellite signal;

determining, based at least in part on a first satellite signal strength of the first satellite signal, a first probability that the first satellite signal is a first line of sight satellite signal based at least in part on a first difference between a first measured range to a first satellite and a first predicted range to the first satellite computed using a first location of the electronic device derived from a non-satellite signal;

determining, based at least in part on a second signal strength of the second satellite signal, a second probability that the second satellite signal is a second line of sight satellite signal based at least in part on a second difference between a second measured range to a second satellite and a second predicted range to the second satellite computed using the first location of the electronic device derived from a non-satellite signal; and estimating a second location of the electronic device based at least in part on the first probability that the first satellite signal corresponds to the first line of sight satellite signal and the second probability that the second satellite signal corresponds to the second line of sight satellite signal, and at least two other satellite signals.

14. The electronic device of claim 13, wherein determining the first probability and the second probability is based on a first hidden Markov model and a second hidden Markov model, respectively.

15. The electronic device of claim 14, wherein inputs to the first and second hidden Markov models include at least one of the first location of the electronic device derived from the non-satellite signal, a signal strength of a satellite signal corresponding to the first or second hidden Markov models or a third hidden Markov model, a pseudorange of a satellite corresponding to the satellite signal, or a multipath indicator that is set based on pre-processing received signals.

16. The electronic device of claim 15, wherein the estimated second location of the electronic device is based on a third location corresponding to a transmitter of the non-satellite signal and a signal strength of the non-satellite signal.

17. The electronic device of claim 15, wherein the estimated second location is further based on at least one of a speed, heading, direction, and time of the electronic device.

18. The electronic device of claim 13, wherein the estimating the second location of the electronic device comprises:

determining a first weight based on the first probability;

applying the first weight to the first satellite signal to generate a weighted first satellite signal;

determining a second weight based on the second probability; and applying the second weight to the second satellite signal to generate a weighted second satellite signal; and estimating the second location based on the weighted first satellite signal and the weighted second satellite signal.

19. A non-transitory machine-readable medium storing instructions that, when executed by one or more processors, cause the one or more processors to perform operations comprising:

receiving, with an electronic device, a first satellite signal and a second satellite signal;

determining, with the electronic device and based at least in part on a first difference between a first measured range to a first satellite and a first predicted range to the first satellite computed using a first location of the electronic device derived from a non-satellite signal, a first probability that the first satellite signal is a first line of sight satellite signal and, determining, based at least in part on a second difference between a second measured range to a second satellite and a second predicted range to the second satellite computed using the first location of the electronic device derived from the non-satellite signal, a second probability that the second satellite signal is a second line of sight satellite signal; and estimating, with the electronic device, a second location of the electronic device based at least in part on the first probability that the first satellite signal corresponds to the first line of sight satellite signal and the second probability that the second satellite signal corresponds to the second line of sight satellite signal, and at least two other satellite signals.

20. The non-transitory machine-readable medium of claim 19, wherein determining the first probability and the second probability is based on a first hidden Markov model and a second hidden Markov model, respectively.

21. The non-transitory machine-readable medium of claim 19, wherein the estimating the second location of the electronic device comprises:

determining a first weight based on the first probability;

applying the first weight to the first satellite signal to generate a weighted first satellite signal;

determining a second weight based on the second probability;

applying the second weight to the second satellite signal to generate a weighted second satellite signal; and estimating the second location based on the weighted first satellite signal and the weighted second satellite signal.

* * * * *